(12) United States Patent
Patel et al.

(10) Patent No.: US 11,494,091 B2
(45) Date of Patent: Nov. 8, 2022

(54) USING CHECKSUMS FOR MINING STORAGE DEVICE ACCESS DATA

(71) Applicant: EMC IP Holding Company LLC, Hopkinton, MA (US)

(72) Inventors: Rimpesh Patel, Bangalore (IN); Amit Pundalik Anchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 17/151,876

(22) Filed: Jan. 19, 2021

(65) Prior Publication Data
US 2022/0229562 A1      Jul. 21, 2022

(51) Int. Cl.
*G06F 12/00*      (2006.01)
*G06F 3/06*       (2006.01)
*G06F 11/10*      (2006.01)

(52) U.S. Cl.
CPC ............ *G06F 3/0619* (2013.01); *G06F 3/067* (2013.01); *G06F 3/0613* (2013.01); *G06F 3/0635* (2013.01); *G06F 3/0659* (2013.01); *G06F 11/1004* (2013.01); *G06F 11/1092* (2013.01)

(58) Field of Classification Search
CPC .... G06F 3/0619; G06F 3/0613; G06F 3/0635; G06F 3/0659; G06F 3/067; G06F 11/1004; G06F 11/1092
USPC ......................................................... 711/154
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Mardochee Chery
(74) *Attorney, Agent, or Firm* — Ryan, Mason & Lewis, LLP

(57) ABSTRACT

An apparatus comprises a processing device configured to control delivery of input-output operations from a host device to a storage system over selected ones of a plurality of paths through a network. The processing device is further configured to receive first and second data outputs corresponding to a plurality of groups of the storage system, to compute first and second pluralities of checksums for respective ones of the groups based on the first and second data outputs, and to determine for the respective ones of the groups whether given ones of the second plurality of checksums differ from given ones of the first plurality of checksums. The control of delivery of the input-output operations is based at least in part on the determination. The plurality of groups each correspond to a plurality of storage devices and the second data output is received after the first data output.

20 Claims, 4 Drawing Sheets

(56) References Cited

U.S. PATENT DOCUMENTS

| | | | |
|---|---|---|---|
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 10,880,217 B2 | 12/2020 | Mallick et al. | |
| 10,884,935 B1 | 1/2021 | Doddaiah | |
| 11,093,139 B1* | 8/2021 | Karr | G06F 3/0685 |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0201458 A1 | 8/2008 | Salil | |
| 2008/0301332 A1 | 12/2008 | Butler et al. | |
| 2009/0259749 A1 | 10/2009 | Barrett et al. | |
| 2010/0313063 A1 | 12/2010 | Venkataraja et al. | |
| 2011/0040943 A1* | 2/2011 | Kondo | G06F 3/0607 711/E12.001 |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0021653 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0133774 A1* | 4/2020 | Kang | G06F 11/1076 |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |
| 2020/0314218 A1 | 10/2020 | Kumar et al. | |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1 | 11/2020 | Smith et al. | |
| 2020/0363985 A1 | 11/2020 | Gokam et al. | |
| 2020/0372401 A1 | 11/2020 | Mallick et al. | |
| 2021/0105224 A1* | 4/2021 | Murray | G06F 16/183 |
| 2021/0286540 A1* | 9/2021 | Tylik | G06F 3/0659 |

FOREIGN PATENT DOCUMENTS

| | | | |
|---|---|---|---|
| EP | 2667569 A1 | 11/2013 | |
| WO | PCT/US2019/052549 | 12/2019 | |
| WO | PCT/US2019/053204 | 12/2019 | |
| WO | PCT/US2019/053473 | 12/2019 | |
| WO | WO-2020014869 A1 * | 1/2020 | G06F 3/0604 |
| WO | PCT/US2019/067144 | 5/2020 | |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

Vmware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

NVM Express, "NVM Express, Base Specification," NVM Express Revision 1.4a, Mar. 9, 2020, 405 pages.

NVM Express, "NVMe Namespaces," https://nvmexpress.org/resources/nvm-express-technology-features/nvme-namespaces/, Accessed Jan. 16, 2021, 8 pages.

Pure Technical Services, "FAQ: NVMe-oF and VMware," https://support.purestorage.com/Solutions/VMware_Platform_Guide/User_Guides_for_VMware_Solutions/Implementing_NVMe_over_Fabrics_with_VMware/FAQ%3A_NVMe-oF_and_VMware, Apr. 15, 2020, 4 pages.

Wikipedia, "Checksum," https://en.wikipedia.org/w/index.php?title=Checksum&oldid=997401 562, Dec. 31, 2020, 4 pages.

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit PundalikAnchi et al. filed Dec. 11, 2019, and entitled "Automated Seamless Migration with Signature Issue Resolution."

* cited by examiner

USING CHECKSUMS FOR MINING STORAGE DEVICE ACCESS DATA

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. The storage ports are typically limited in number and each has limited resources for handling IO operations received from the host devices. Different ones of the host devices can run different applications with varying workloads and associated IO patterns. Such host devices also generate additional IO operations in performing various data services such as replication and migration so as to meet business continuity requirements.

Host device multi-pathing arrangements may use different protocols to access storage systems and/or obtain information about the storage systems and paths to the storage systems. One such protocol is NVMe (Non-Volatile Memory Express) protocol. For example, Asymmetric Namespace Access (ANA) is an NVMe standard implemented to enable host devices to obtain information about accessing a given namespace of a storage array.

SUMMARY

Illustrative embodiments configure a host device to include functionality for analyzing storage device access data received from a storage array. For example, some embodiments include techniques for enabling a host device to compute and compare checksums to efficiently determine namespace state changes.

In one embodiment, an apparatus comprises at least one processing device that is configured to control delivery of input-output operations from a host device to a storage system over selected ones of a plurality of paths through a network. The at least one processing device is further configured to receive a first data output corresponding to a plurality of groups of the storage system, wherein the plurality of groups each correspond to a plurality of storage devices, to compute a first plurality of checksums for respective ones of the plurality of groups based at least in part on the first data output, to receive a second data output corresponding to the plurality of groups, wherein the second data output is received after the first data output, and to compute a second plurality of checksums for the respective ones of the plurality of groups based at least in part on the second data output. The at least one processing devices is also configured to determine for the respective ones of the plurality of groups whether given ones of the second plurality of checksums differ from given ones of the first plurality of checksums. The control of delivery of the input-output operations from the host device to the storage system is based at least in part on the determination.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
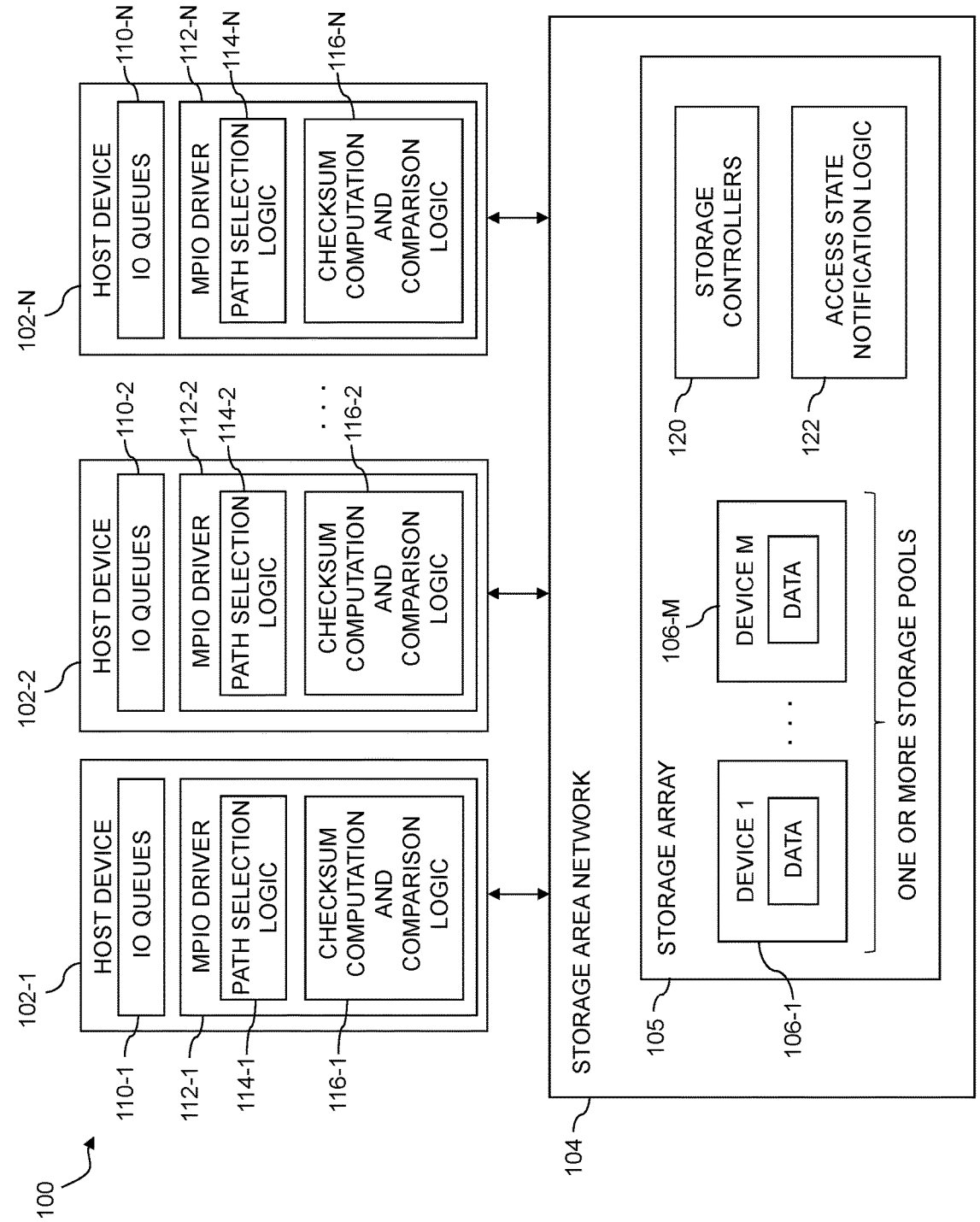
FIG. 1 is a block diagram of an information processing system configured with functionality in a multi-path layer of a host device for analyzing storage device access data received from a storage array in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement LUNs or namespaces configured to store objects for users associated with the host devices 102. These objects can comprise files, blocks or other types of objects. LUNs are implemented in connection with Small Computer System Interface (SCSI) protocol and namespaces are implemented in connection with NVMe protocol.

As used herein, the term "namespace" is intended to be broadly construed so as to encompass, for example, a collection of logical block addresses (LBAs) accessible to host software. A namespace can correspond to the isolation of logical blocks addressable by the host software.

As used herein, a "namespace ID (NSID)" is intended to be broadly construed so as to encompass, for example, an identifier used by a storage controller to provide access to a namespace. In Linux, for example, namespaces each appear with a unique identifier in devices (e.g., /dev/nvme0n1 refers to controller 0 and namespace 1).

As used herein, the term "server" is to be broadly construed, and may encompass a host device, such as, for example, host device 102-1, a portion of a host device or a processing device separate from a host device.

The host devices 102 interact with the storage array 105 utilizing read and write commands as well as other types of commands, such as, for example, SCSI commands like log select and log sense commands, or NVMe commands like the Get Log Page command, described further herein, that are transmitted over the SAN 104. A given IO operation as that term is broadly used herein illustratively comprises one or more such commands. References herein to terms such as "input-output" and "IO" should be understood to refer to input and/or output. Thus, an IO operation relates to at least one of input and output.

Example embodiments refer to NVMe commands, although other types of commands (e.g., SCSI commands) can be used in other embodiments. Some embodiments can implement IO operations utilizing command features and functionality associated with NVMe protocol, as described in the NVMe Specification, Revision 1.4a, March 2020, which is incorporated by reference herein. Other storage protocols of this type that may be utilized in illustrative embodiments disclosed herein include NVMe over Fabric, also referred to as NVMeoF.

The term "storage device" as used herein is intended to be broadly construed, so as to encompass, for example, a logical storage device such as a namespace, LUN or other logical storage volume. A logical storage device can be defined in the storage array 105 to include different portions of one or more physical storage devices. Storage devices 106 may therefore be viewed as comprising respective namespaces, LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for analyzing storage device access data received from a storage array. Such functionality is provided at least in part using respective instances of path selection logic 114-1, 114-2, . . . 114-N, and respective instances of checksum computation and comparison logic 116-1, 116-2, . . . 116-N implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for analyzing storage device access data received from a storage array. Other types of MPIO drivers from other driver vendors may be suitably modified to incorporate functionality for analyzing storage device access data received from a storage array as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise namespaces, LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105, or other types of functions, such as log sense commands to send requests to the storage array 105 for data corresponding to performance of one or more switch fabrics in the SAN 104. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective NVMe or SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a namespace, LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, log select and log sense commands as described herein, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new namespaces, LUNs or other logical storage volumes associated with the one or more new paths identified in the path discovery scan.

The path discovery scan may comprise, for example, one or more bus scans which are configured to discover the appearance of any new namespaces or LUNs that have been added to the storage array 105 as well to discover the disappearance of any existing namespaces, LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As is apparent from the foregoing, MPIO driver 112-1 of host device 102-1 is configured to control delivery of IO operations from the host device 102-1 to the storage array 105 over selected paths through the SAN 104.

The MPIO driver 112-1 is further configured with checksum computation and comparison logic 116-1 to parse responses to requests for storage device access states received from the storage array 105. For example, as noted herein, ANA is an NVMe standard implemented to enable host devices to obtain information about accessing a given namespace of a storage array. In illustrative embodiments, a storage array 105 reports ANA states for volumes in response to NVMe Get Log Page commands from a host device 102-1 to the storage array 105. In order to read ANA state changes for each volume, the host device 102-1 sends Get Log Page commands to the storage array 105. Using the storage controller 120 and the access state notification logic 122, the storage array 105 responds to the Get Log Page command with different ANA states of given namespaces of the storage array 105. The host device 102-1, and more particularly, the checksum computation and comparison logic 116-1 analyzes a response to a Get Log Page command received from the storage array 105 and, along with the path selection logic 114-1 applies the identified ANA states when selecting the paths to the volume.

In one or more embodiments, a response by a storage array 105 to a request for state information from a host device 102-1 (e.g., Get Log Page command) includes a response header having a change-count indicating if content of a log page has changed from a previous invocation. While the storage array 105 reports an incremented change count from its previous value in a response header to indicate if content of a complete log page has changed from its previous invocation, the storage array 105 fails to provide change counts at a finer granularity, for example at an ANA group descriptor level. ANA group descriptors include ANA information for the ANA groups that comprise namespaces that are attached to the given storage controller 120 processing the Get Log Page command. For example, an output to the Get Log Page command may specify the number of ANA group descriptors available in the log page, and include one ANA group descriptor for each ANA group that contains namespaces attached to the given storage controller 120. Each ANA group descriptor comprises a series of bytes indicating, for example, an ANA group identifier (ANA group ID), which identifies the ANA group that is the subject of the descriptor, the number of NSID values in the group descriptor and the NSIDs for each of the namespaces in the group.

Absent the techniques of the embodiments, when a storage array fails to provide change counts at a finer granularity (e.g., ANA group descriptor level), as is common with many current storage arrays, there is an incurred cost of mining through all group descriptor data to determine which group descriptor corresponds to the content that was changed. This cost is borne by host device software (e.g., multi-pathing software), which causes inefficiencies and processing delays during tasks where there may be multiple ANA state transitions, such as during volume-migration and array non-disruptive upgrades. Accordingly, in illustrative embodiments, the checksum computation and comparison logic 116-1 of a host device 102-1 computes and stores checksums of content for each ANA group descriptor, so in subsequent invocations, the checksum computation and comparison logic 116-1 compares current computed checksums with previously stored checksums to determine any differences and optimally mines only the group descriptor content for which the checksums are different. Additional examples of analyzing storage device access data received from a storage array are described below in conjunction with the embodiments of FIGS. 1 through 4.

In the FIG. 1 embodiment, the storage array 105 comprises a plurality of storage controllers 120 and one or more instances of access state notification logic 122. A more detailed example of the access state notification logic 122 will be described below in conjunction with the embodiments of FIGS. 1 through 4. Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

In illustrative embodiments, techniques are provided to enable a host device 102-1 to compute and store checksums for ANA group descriptors received in ANA buffers. A checksum is computed for the group descriptor data pertaining to a given group ID, and the computed checksums for each ANA group descriptor are mapped to respective ANA group IDs. In order to determine ANA state changes, which affect path selection for IO operations by the path selection logic 114-1 of the MPIO driver 112-1, the host device 102-1 periodically requests ANA buffers, using for example, Get Log Page commands. For each response sent by the storage array 105 (e.g., log page) and received by the host device 102-1, the checksum computation and comparison logic 116-1 computes and stores the checksums for each ANA group descriptor associated with an ANA group ID in the response buffer and compares the computed values with any previously stored checksums for the same ANA group IDs that were computed and stored from a previously received storage array response. If a given computed value remains the same as a previously stored checksum value, then the checksum computation and comparison logic 116-1 concludes there has been no change from previously collected and digested ANA buffer data for that particular group ID. Based on this conclusion, the host device 102-1 determines that that there are no storage volume (e.g., namespace) state changes for that particular group ID and does not perform further mining of the data in the response buffer for that ANA group. The host device 102-1 mines only portions of the ANA log page buffer corresponding to previously stored checksums that are different from computed values to determine any changes in the ANA states of their volumes/namespaces.

For example, the host device 102-1 receives a first data output from a storage array 105 corresponding to a plurality of groups (e.g., ANA groups) of the storage array. The plurality of groups each correspond to a plurality of storage devices (e.g., namespaces associated with an NSID). The checksum computation and comparison logic 116-1 computes a first plurality of checksums for respective ones of the plurality of groups identified and described in the first data output. At a subsequent point in time after receiving the first data output, the host device 102-1 receives a second data output from the storage array 105 corresponding to the plurality of groups, and the checksum computation and comparison logic 116-1 computes a second plurality of checksums for the respective ones of the plurality of groups identified and described in the second data output. The checksum computation and comparison logic 116-1 determines for the respective ones of the plurality of groups whether given ones of the second plurality of checksums differ from given ones of the first plurality of checksums. In response to an affirmative determination, the checksum computation and comparison logic 116-1 identifies at least one group of the plurality of groups corresponding to a checksum difference between computed checksums for that group in the first and the second plurality of checksums. The host device 102-1 mines and analyzes the buffer data for the identified group and from the analysis identifies one or more storage devices of the identified group corresponding to a state change. The path selection logic 114-1 controls delivery of IO operations from the host device 102-1 to the storage array 105 based at least in part on the state change of the one or more storage devices. A state change comprises, for example, removal of a storage device, replacement of a storage device with a new storage device, an addition of a new storage device and/or an ANA state change. A response buffer may specify ANA states for namespaces as, for example, optimized, non-optimized, inaccessible, changed or in a persistent loss state. For example, an ANA group descriptor can include a field for ANA state, indicating the ANA state for all namespaces in an ANA Group when accessed through a controller.

As noted herein, the first and the second data outputs (e.g., response buffers) comprise a plurality of ANA group descriptors for the respective ones of the plurality of ANA groups, and the checksum computation and comparison logic 116-1 computes checksums for the plurality of ANA group descriptors in the first and second data outputs. The term "checksum" as used herein is intended to be broadly construed, so as to encompass, for example, a smaller-sized block of data generated from a larger block of data and used for the purpose of detecting changes in the data from a previous version. Checksums are generated using, for example, a checksum function or checksum algorithm. A hash function may be used to compute a checksum. According to the embodiments, if a computed checksum for a group in a current output received from a storage array matches the stored value of a previously computed checksum for that group, the checksum computation and comparison logic 116-1 determines, based on the same computed checksum, that no storage devices of that group correspond to a state change. As a result, the host device 102-1 does not mine or analyze the buffer data for the group associated with the same checksum. The host device 102-1 stores computed checksums in one or more storage buffers, caches and/or databases of the host device 102-1.

As noted herein, the host device 102-1 transmits requests for storage device access information to the storage array 105. In some embodiments, such requests are transmitted to the storage array utilizing one or more NVMe protocol commands, such as, for example, the Get Log Page command as described herein, which are processed by the storage controller 120 and the access state notification logic 122 to provide a response with the access state information to the host device 102-1. The embodiments are not necessarily limited to the use of NVMe protocol commands, and may also be utilized with other protocols, including but not necessarily limited to the SCSI protocol-based storage and its associated commands.

Figure 4:
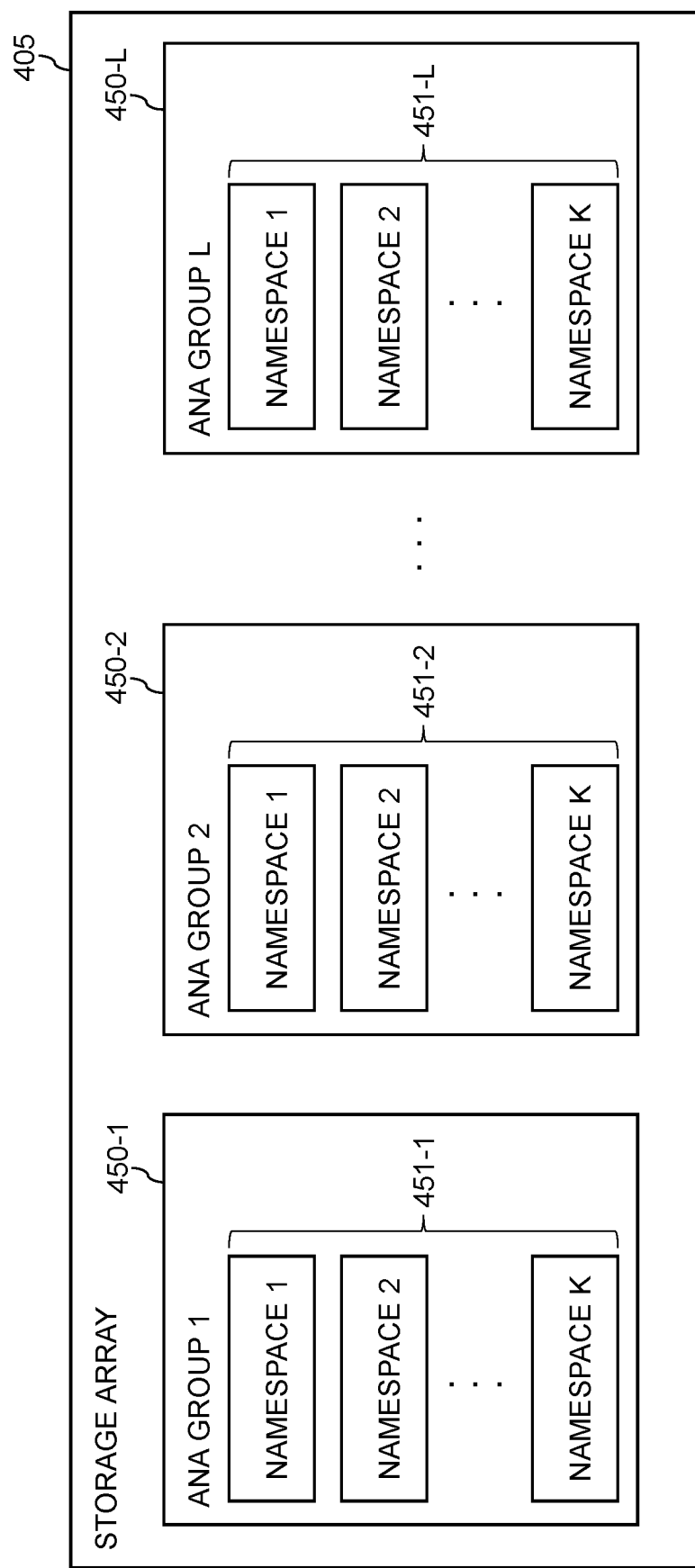
FIG. 4 is a block diagram showing ANA groups of a storage array in an illustrative embodiment.

Referring to FIG. 4, an example storage array 405 comprises a plurality of ANA groups, ANA group 1 450-1, ANA group 2 450-2, ... ANA group L 450-L (collectively "ANA groups 450"). Each ANA group 450 comprises a plurality of namespaces (namespace 1, namespace 2, ... namespace K) 451-1, 451-2, ... 451-L (collectively "namespaces 451"). The number of ANA groups 450 and the number of namespaces 451 in each ANA group can vary.

According to an illustrative embodiment, in a response to a host device request for access state information, a response by the storage array 405 identifies the ANA groups 450 by respective ANA group IDs in respective ANA group descriptors for each of the ANA groups 450. Each ANA group descriptor includes NSIDs for the namespaces 451 associated with a given ANA group ID. In a non-limiting operational example, a host device is attached to an NVMe supported storage array with 100 namespaces, which are grouped into 4 ANA groups, 25 namespaces to each ANA group. As a result, a Get Log Page response buffer will have 4 ANA group descriptors, each containing 25 NSIDs.

The host device software, such as multi-pathing software (e.g., MPIO driver 112-1 including checksum computation and comparison logic 116-1), computes checksums for each of the 4 ANA group descriptors in the Get Log Page response buffer.

If there is a change in one group that would translate into content change of only one group descriptor, the host device software, such as multi-pathing software (e.g., MPIO driver 112-1 including checksum computation and comparison logic 116-1), determines that there is only the change to the one group by comparing current computed checksums to previously computed checksums for the plurality of group descriptors and determining that there is a checksum difference for only the group descriptor corresponding to the group having the change. As a result, the host device 102-1 mines only the data in the response buffer associated with the group having the change to determine the nature of the change. Absent the techniques of the embodiments, the host device 102-1 would mine the data associated with all of the ANA groups to determine where the change occurred, as current storage arrays do not provide state change notifications at the group descriptor granularity level. Advantageously, such quick mining of only group descriptors with different checksums enables host devices to conclude correct ANA states much more quickly than with previous approaches, which enables more efficient and accurate path selection in cases where ANA states are transitioning during storage array tasks like volume-migration, array non-disruptive upgrades and other such case(s) where ANA state changes occur.

As noted herein, information can be obtained by the host device 102-1 from the storage array 105, or information can be obtained by the storage array 105 from the host device 102-1 utilizing an in-band communication mechanism in which one or more predetermined commands in a designated storage protocol are sent from the host device 102-1 to the storage array 105 or vice versa. Such predetermined commands can comprise, for example, a Get Log Page command, log sense and log select commands, a mode sense command, a VU command, or combinations of multiple instances of these or other commands, in an otherwise standardized command format, such as NVMe format, SCSI format or other type of format.

Additionally or alternatively, information can be obtained by the host device 102-1 from the storage array 105, or information can be obtained by the storage array 105 from the host device 102-1 utilizing an out-of-band communication mechanism. For example, an out-of-band communication mechanism of this type can involve host management software of the host device 102-1 communicating with storage array management software of the storage array 105 over an IP network connection or other type of network connection.

These and other functions related to analyzing storage device access data received from a storage array that are referred to herein as being performed by or under the control of the MPIO driver 112-1 can in some embodiments be performed at least in part outside of the MPIO driver 112-1, such as in the host device 102-1 generally.

References herein to an MPIO driver such as MPIO driver 112-1 being configured to receive and process storage device access data from a storage array are intended to be broadly construed, and should not be viewed as being limited to any particular storage arrangement, such as storage in a particular host device component or using a particular format. Accordingly, such storage can be in a memory or other storage device that is outside of the MPIO driver.

Illustrative embodiments provide for optimal handling of access state (e.g., ANA) buffer data mining by host devices. Host device multi-pathing software works in tandem with storage array tasks such as, for example, volume migrations or array non-disruptive upgrades. In such storage array tasks, access states (e.g., NVMe ANA states) are being transitioned from one state to another state by the storage arrays, which expect host software to act in accordance with the changed ANA states. Hosts corresponding to multiple storage volumes (e.g., namespaces) are required to quickly consume state changes with respect to their configurations and data structures in order to successfully process IO operations.

Advantageously, in an illustrative embodiment, the checksum computation and comparison logic 116-1 of the MPIO driver 112-1 pairs ANA group IDs with checksums computed for group descriptor parts of an ANA buffer. Such pairings are maintained (e.g., in memory) by the host device 102-1 for each storage array. Checksums are computed for group descriptor data pertaining to respective ANA group IDs. When periodically gathering ANA buffers (e.g., every 10 seconds), the checksum computation and comparison logic 116-1 computes and stores the checksums for each ANA group ID and compares the computed values with previously stored checksums for the same ANA Group IDs that were computed from an earlier received ANA buffer. If a given computed value remains the same as a previously stored checksum value, then there has been no change from previously collected and analyzed ANA buffer data for that particular group ID. Only portions of an ANA log page buffer corresponding to computed checksums different from previously stored checksum values need to be mined to determine the respective ANA states of their corresponding volumes (e.g., namespaces). Changed ANA states are used for multi-pathing decisions by the path selection logic 114-1 to identify whether paths are viable for IO operation activity, are in transition and/or require retry after a certain amount of time.

The above-described functions associated with analyzing storage device access data received from a storage array in the MPIO driver 112-1 are carried out at least in part under the control of its path selection logic 114-1 and/or checksum computation and comparison logic 116-1. For example, the path selection logic 114-1 and/or checksum computation and comparison logic 116-1 are illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for analyzing storage device access data received from a storage array.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in "Dell EMC SC Series Storage and Microsoft Multipath I/O," Dell EMC, CML 1004, July 2018, which is incorporated by reference herein. Such conventional MPIO functionality is suitably modified in illustrative embodiments disclosed herein to support analyzing storage device access data received from a storage array.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA).

Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs and namespaces.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of arrangements, including, by way of example, active-passive arrangements, active-active Asymmetric Logical Unit Access (ALUA) arrangements, other types of ALUA arrangements and the ANA arrangements as detailed herein.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 and checksum computation and comparison logic 116 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as namespaces, LUNs or other logical storage volumes.

Figure 2:
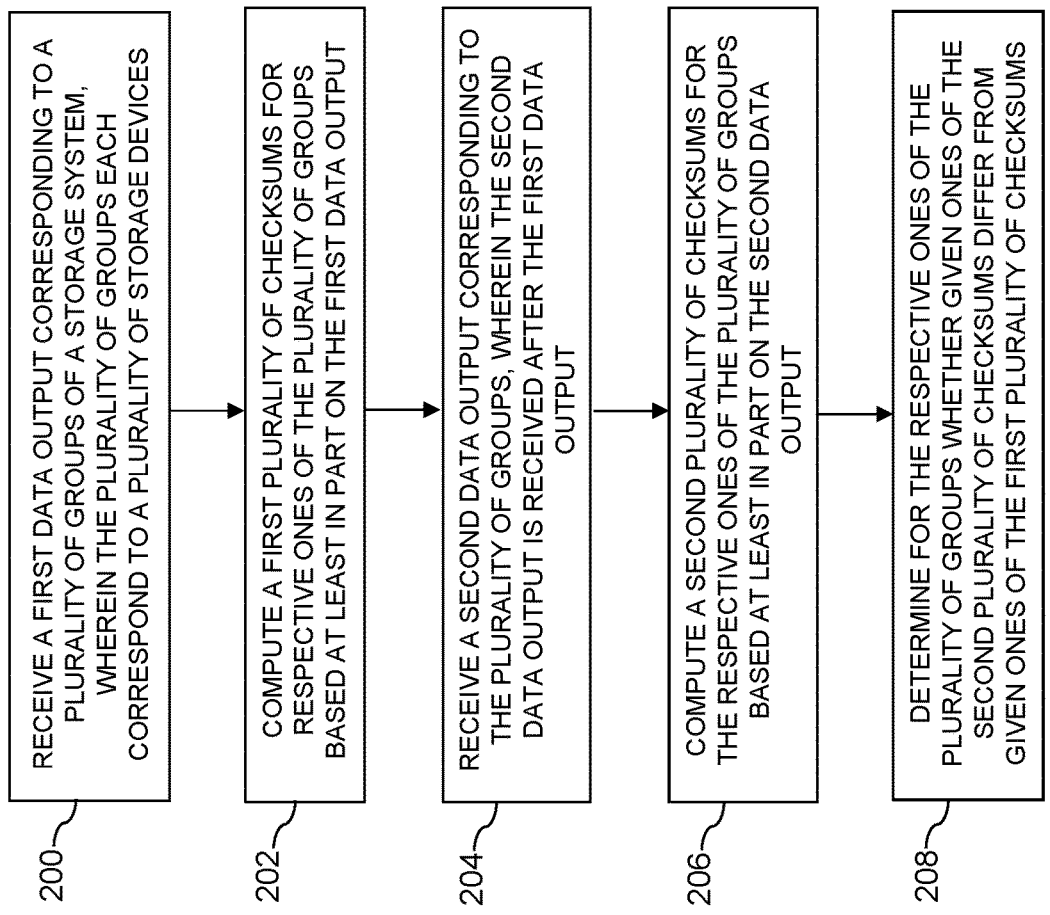
FIG. 2 is a flow diagram of a process for analyzing storage device access data received from a storage array in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 and/or checksum computation and comparison logic 116-1 of the MPIO driver 112-1 of host device 102-1. Other arrangements of host device components and/or other system components can be configured to perform at least portions of one or more of the steps in other embodiments.

In step 200, a first data output corresponding to a plurality of groups of a storage system is received, wherein the plurality of groups each correspond to a plurality of storage devices. According to one or more embodiments, the plurality of groups comprise respective ones of a plurality of ANA groups, and the plurality of storage devices comprise a plurality of storage volumes, respective ones of the plurality of storage volumes corresponding to a namespace associated with a NSID.

In step 202, a first plurality of checksums for respective ones of the plurality of groups is computed based at least in part on the first data output. In step 204, a second data output corresponding to the plurality of groups is received, wherein the second data output is received after the first data output. In step 206, a second plurality of checksums for the respective ones of the plurality of groups is computed based at least in part on the second data output. According to one or more embodiments, the first and the second data outputs comprise a plurality of ANA group descriptors for the respective ones of the plurality of ANA groups, and computing the first and the second plurality of checksums comprises computing checksums for the plurality of ANA group descriptors in the first and second data outputs.

In step 208, there is a determination for the respective ones of the plurality of groups whether given ones of the second plurality of checksums differ from given ones of the first plurality of checksums. Control of delivery of IO operations from a host device to the storage system is based at least in part on the determination.

In response to an affirmative determination, at least one group of the plurality of groups corresponding to a checksum difference between computed checksums for the at least one group in the first and the second plurality of checksums is identified. Additionally, one or more storage devices of the at least one group corresponding to a state change are identified, and the control of delivery of the IO operations is based at least in part on the state change of the one or more storage devices. The state change comprises at least one of a removal of a storage device, a replacement of a storage device and an addition of a storage device.

In illustrative embodiments, at least one group of the plurality of groups corresponding to the same computed checksum in the first and the second plurality of checksums is identified, and based on the same computed checksum, there is a determination that no storage devices of the least one group correspond to a state change.

Multiple additional instances of the FIG. 2 process may be performed in respective additional host devices that share the storage array. Other embodiments can include multiple storage arrays, with the disclosed functionality for analyzing storage device access data received from a storage array being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for analyzing storage device access data received from a storage array. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement the disclosed functionality for analyzing storage device access data received from a storage array within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
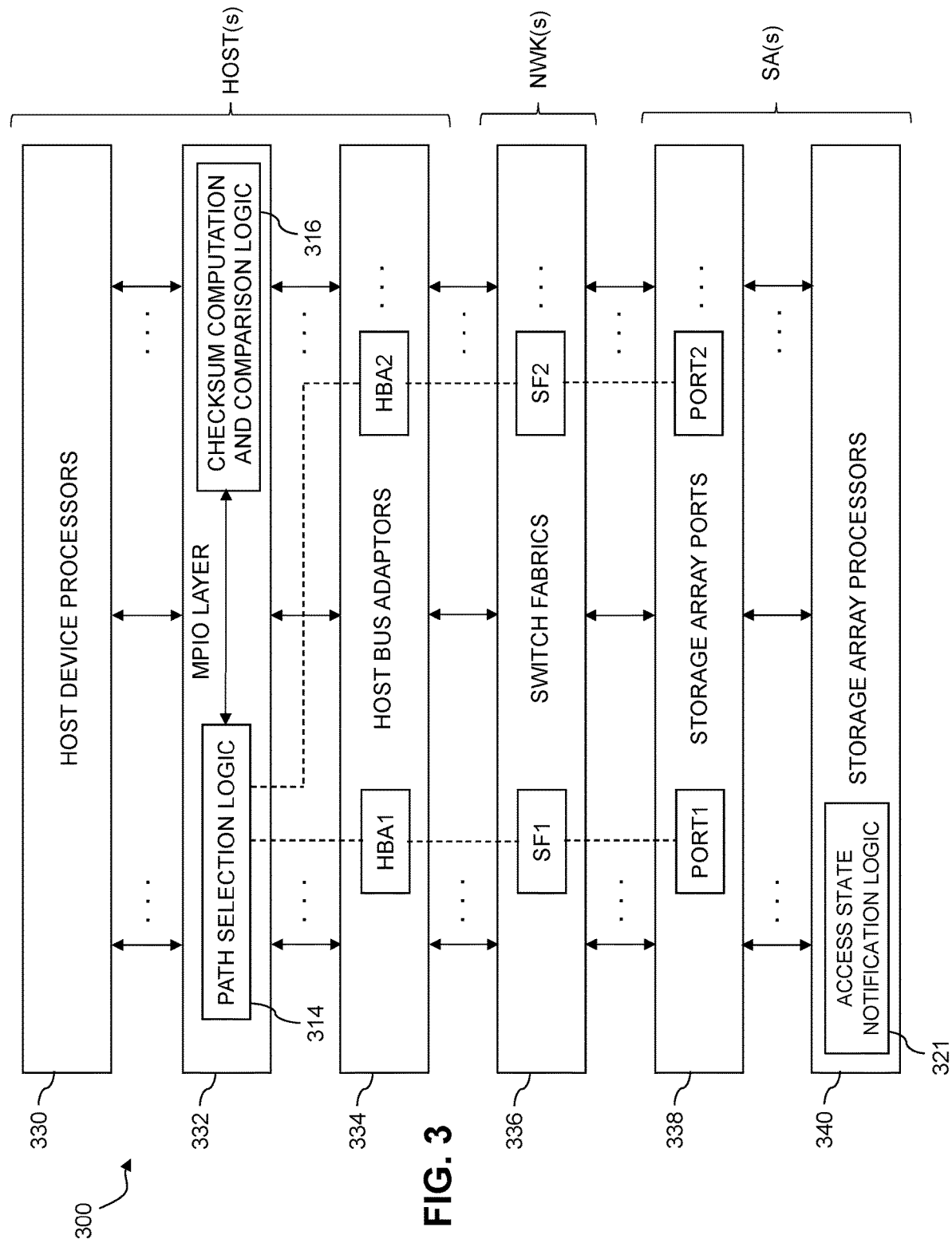
FIG. 3 is a block diagram showing multiple layers of a layered system architecture that includes a multi-path layer with functionality for analyzing storage device access data received from a storage array in an illustrative embodiment.

Referring now to FIG. 3, another illustrative embodiment is shown. In this embodiment, an information processing system 300 comprises one or more instances of path selection logic 314, checksum computation and comparison logic 316 and access state notification logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements analysis of storage device access data received from a storage array as characterized by checksum computation and comparison logic 316. The checksum computation and comparison logic 316 is illustratively shown as part of the MPIO layer 332. Alternatively, the checksum computation and comparison logic 316 in other embodiments is illustratively stored, at least partially, in the host device processor layer 330. It is also possible in some embodiments that the checksum computation and comparison logic 316 can be incorporated within a data structure of the path selection logic 314. The checksum computation and comparison logic 316 (or 116) illustratively computes and stores checksums for group descriptors received in access state information buffers received from a storage array. In order to determine access state changes (e.g., ANA state changes), which affect path selection for IO operations by the path selection logic 314 of the MPIO layer 332, the host device via, for example, the host device processor or MPIO layers 330 and 332, periodically requests access state data buffers, using for example, Get Log Page commands. For each response (e.g., log page) processed and sent by, for example, the access state notification logic 321 of the storage array processor layer 340, and received by a host device, the checksum computation and comparison logic 316 computes and stores the checksums for each group descriptor (e.g., ANA group descriptor) associated with a group ID (e.g., ANA group ID) in the response buffer. The checksum computation and comparison logic 316 compares the computed checksum values with any previously stored checksums for the same group IDs that were computed and stored from a previously received storage array response. If a given computed value remains the same as a previously stored checksum value, then the checksum computation and comparison logic 316 concludes there has been no change from previously collected and digested buffer data for that particular group ID. Based on this conclusion, the path selection logic 314 determines that that there are no storage volume (e.g., namespace) state changes for that particular group ID and does not perform further analysis of the data in the response buffer for that group. The host device (e.g., path selection logic 314) mines only portions of the log page buffer corresponding to previously stored checksums that are different from computed values to determine the corresponding changes in the states of those storage volumes corresponding to the groups with the different checksums. The checksum computation and comparison logic 316, along with the path selection logic 314 manages IO operations over the selected ones of the plurality of paths responsive to the identified changes in storage device access states.

According to an embodiment, the storage array processor layer 340 receives requests for access state information from a host device, and processes and responds to such requests using the access state notification logic 321 (or 122). For example, the access state notification logic 321 receives and responds to Get Log Page commands received from a host device with a log page including ANA group IDs, ANA group descriptors and NSIDs along with any state changes of the associated storage volumes (e.g., namespaces). The access state notification logic 321 waits for polling from a connected host device requesting the access state details. The access state notification logic 321 is implemented in the storage array processor layer 340 and can include functionality for the system 300 the same or similar to that described in connection with the access state notification logic 122. It is also possible in some embodiments that the access state notification logic 321 can include multiple logic instances for respective ones of a plurality of storage arrays of the system 300.

The MPIO layer 332 is an example of what is also referred to herein as a multi-path layer, and comprises one or more MPIO drivers implemented in respective host devices. Each such MPIO driver illustratively comprises an instance of path selection logic 314 and checksum computation and comparison logic 316 configured to implement functionality for analyzing storage device access data received from a storage array substantially as previously described. Additional or alternative layers and path selection and/or checksum computation and comparison logic arrangements can be used in other embodiments.

In the system 300, path selection logic 314 is configured to select different paths for sending IO operations and/or commands from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations and/or commands to the one or more storage arrays having the storage array ports of the storage array port layer 338. In selecting the paths, the path selection logic 314 illustratively limits amounts of IO operations and/or commands that are delivered over one or more paths to particular ones of the ports of a storage array.

It is assumed in this embodiment that the host devices through their respective MPIO drivers and respective instances of path selection logic 314 and checksum computation and comparison logic 316 provide functionality for analyzing storage device access data received from a storage array, possibly with involvement of other host device components.

Accordingly, in some embodiments, the path selection logic 314 utilizes the checksum computation and comparison logic 316 in determining appropriate paths over which to send particular IO operations and/or commands to ports of one or more storage arrays. As described elsewhere herein, such receiving and processing of storage device access data can substantially improve system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

The particular features and functionality of the illustrative embodiments described above can be varied in other embodiments.

Also, as mentioned previously, different instances of the above-described algorithms and other storage device access data receiving and processing techniques can be performed by different MPIO drivers in different host devices.

The particular storage device access data receiving and processing arrangements described above are therefore presented by way of illustrative example only. Numerous alternative arrangements of these and other features can be used in implementing the storage device access data receiving and processing functionality in other illustrative embodiments.

The illustrative embodiments disclosed herein can provide a number of significant advantages relative to conventional arrangements that fail to provide efficient techniques for analyzing whether storage volumes associated with given groups in a response buffer are subject to state changes. Advantageously, the embodiments configure a multi-path layer of one or more host devices to include functionality for analyzing storage device access data received from a storage array, leading to enhanced overall performance. For example, using checksum computation and comparison logic, a multi-path layer advantageously uses checksums to quickly compare group descriptors from different response buffers to ascertain whether there have been changes to storage volume access states. By computing and comparing checksums of respective group descriptors in each response buffer, the embodiments eliminate the need to parse through entire portions of group descriptor data in each buffer to determine whether there have been changes to storage volumes for each group.

Absent a triggering event, host multi-pathing software currently has no mechanism to be informed of ANA state changes. In the absence of a triggering event, the host periodically (e.g., every 5 seconds, 10 seconds, 30 seconds, minute, etc.) polls/gathers ANA buffers and extracts/digests buffer data for multi-pathing purposes. As a result, there are numerous instances where there are no changes from such previous polls. Under conventional techniques, host devices waste considerable time parsing through ANA buffers to determine that no state changes have occurred. With the techniques of the embodiments, the host devices need only compute checksum values and compare the computed values with previously stored values to determine whether changes have occurred, which is more efficient than conventional ANA buffer data mining.

These and other illustrative embodiments provide significant advantages over conventional practice. For example, such embodiments are much more efficient and effective than conventional multipathing solutions that require parsing of an entire ANA log page before recognizing ANA state changes. Unlike former approaches, according to the embodiments, parsing time is reduced considerably by comparing computed and stored checksums for differences, resulting in increased IO operation performance.

Illustrative embodiments provide techniques for host devices to compute and store checksums of content according to group descriptor. For each subsequent invocation, the host device software compares current computed checksums with previously stored checksums, and optimally mines only the group descriptor content for which the checksums are different. Advantageously, such pinpointed mining enables host device software to conclude correct ANA states much more quickly, and avoids parsing through data where there were no ANA state changes. The embodiments therefore provide for efficient and timely multi-pathing decisions to be made in cases where ANA states are often transitioning during storage array tasks like volume-migration, array non-disruptive upgrades and other such case(s) where ANA state changes occur.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114, checksum computation and comparison logic 116 and access state notification logic 122 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, checksum computation and comparison logic, access state notification logic and additional or alternative components. Also, the particular configurations of system and device elements and associated processing operations illustratively shown in the drawings can be varied in other embodiments. For example, a wide variety of different MPIO driver configurations and associated storage device access data receiving and processing arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
wherein the at least one processing device is configured:
to control delivery of input-output operations from a host device to a storage system over selected ones of a plurality of paths through a network;
to receive a first data output corresponding to a plurality of groups of the storage system, wherein the plurality of groups each correspond to a plurality of storage devices;
to compute a first plurality of checksums for respective ones of the plurality of groups based at least in part on the first data output;
to receive a second data output corresponding to the plurality of groups, wherein the second data output is received after the first data output;
to compute a second plurality of checksums for the respective ones of the plurality of groups based at least in part on the second data output;
to determine for the respective ones of the plurality of groups whether given ones of the second plurality of checksums differ from given ones of the first plurality of checksums;
wherein the plurality of groups comprise respective ones of a plurality of logical region access groups, and the first and the second data outputs comprise a plurality of logical region access group descriptors for the respective ones of the plurality of logical region access groups; and
wherein the first and the second plurality of checksums are computed based at least in part on the plurality of logical region access group descriptors in the first and second data outputs;
to identify, in response to an affirmative determination, at least one logical region access group of the plurality of logical region access groups corresponding to a checksum difference between computed checksums for the at least one logical region access group in the first and the second plurality of checksums; and to identify one or more storage devices of the at least one logical region access group corresponding to a state change;

wherein the control of delivery of the input-output operations from the host device to the storage system is based at least in part on the determination.

2. The apparatus of claim 1 wherein the respective ones of the plurality of logical region access groups comprise respective ones of a plurality of asymmetric namespace access (ANA) groups.

3. The apparatus of claim 2 wherein the plurality of storage devices comprise a plurality of storage volumes, respective ones of the plurality of storage volumes corresponding to a namespace associated with a namespace identifier.

4. The apparatus of claim 2 wherein:
the plurality of logical region access group descriptors comprise a plurality of ANA group descriptors for the respective ones of the plurality of ANA groups; and
the first and the second plurality of checksums are computed for the plurality of ANA group descriptors in the first and second data outputs.

5. The apparatus of claim 1 wherein said at least one processing device comprises at least one multi-path input-output driver implemented in the host device and configured to control delivery of the input-output operations to storage devices of the storage system over the selected ones of the plurality of paths through the network.

6. The apparatus of claim 1
wherein the control of delivery of the input-output operations from the host device to the storage system is based at least in part on the state change of the one or more storage devices.

7. The apparatus of claim 6 wherein the state change comprises at least one of a removal of a storage device, a replacement of a storage device, an addition of a storage device and an access state change of a storage device.

8. The apparatus of claim 1 wherein the at least one processing device is further configured:
to identify at least one other logical region access group of the plurality of logical region access groups corresponding to the same computed checksum in the first and the second plurality of checksums; and
to determine, based on the same computed checksum, that no storage devices of the least one other logical region access group correspond to a state change.

9. The apparatus of claim 1 wherein the at least one processing device is further configured to store the first and the second plurality of checksums.

10. The apparatus of claim 1 wherein:
the first and the second data outputs are received from the storage system; and
the at least one processing device is further configured to transmit respective first and second requests to the storage system for the first and the second data outputs.

11. The apparatus of claim 10 wherein the first and second requests are transmitted to the storage system utilizing one or more Non-Volatile Memory Express (NVMe) protocol commands.

12. The apparatus of claim 11 wherein the one or more NVMe protocol commands comprise a Get Log Page command.

13. A computer program product comprising a non-transitory processor-readable storage medium having stored therein program code of one or more software programs, wherein the program code, when executed by at least one processing device comprising a processor coupled to a memory, causes the at least one processing device:

to control delivery of input-output operations from a host device to a storage system over selected ones of a plurality of paths through a network;

to receive a first data output corresponding to a plurality of groups of the storage system, wherein the plurality of groups each correspond to a plurality of storage devices;

to compute a first plurality of checksums for respective ones of the plurality of groups based at least in part on the first data output;

to receive a second data output corresponding to the plurality of groups, wherein the second data output is received after the first data output;

to compute a second plurality of checksums for the respective ones of the plurality of groups based at least in part on the second data output; and to determine for the respective ones of the plurality of groups whether given ones of the second plurality of checksums differ from given ones of the first plurality of checksums;

wherein the plurality of groups comprise respective ones of a plurality of logical region access groups, and the first and the second data outputs comprise a plurality of logical region access group descriptors for the respective ones of the plurality of logical region access groups; and wherein the first and the second plurality of checksums are computed based at least in part on the plurality of logical region access group descriptors in the first and second data outputs;

to identify, in response to an affirmative determination, at least one logical region access group of the plurality of logical region access groups corresponding to a checksum difference between computed checksums for the at least one logical region access group in the first and the second plurality of checksums; and to identify one or more storage devices of the at least one logical region access group corresponding to a state change;

wherein the control of delivery of the input-output operations from the host device to the storage system is based at least in part on the determination.

14. The computer program product of claim 13 wherein the respective ones of the plurality of logical region access groups comprise respective ones of a plurality of asymmetric namespace access (ANA) groups.

15. The computer program product of claim 14 wherein:
the plurality of logical region access group descriptors comprise a plurality of ANA group descriptors for the respective ones of the plurality of ANA groups; and
the first and the second plurality of checksums are computed for the plurality of ANA group descriptors in the first and second data outputs.

16. The computer program product of claim 13
wherein the control of delivery of the input-output operations from the host device to the storage system is based at least in part on the state change of the one or more storage devices.

17. A method comprising:
controlling delivery of input-output operations from a host device to a storage system over selected ones of a plurality of paths through a network;

receiving a first data output corresponding to a plurality of groups of the storage system, wherein the plurality of groups each correspond to a plurality of storage devices;

computing a first plurality of checksums for respective ones of the plurality of groups based at least in part on the first data output;

receiving a second data output corresponding to the plurality of groups, wherein the second data output is received after the first data output;

computing a second plurality of checksums for the respective ones of the plurality of groups based at least in part on the second data output; and determining for the respective ones of the plurality of groups whether given ones of the second plurality of checksums differ from given ones of the first plurality of checksums;

wherein the plurality of groups comprise respective ones of a plurality of logical region access groups, and the first and the second data outputs comprise a plurality of logical region access group descriptors for the respective ones of the plurality of logical region access groups; and wherein the first and the second plurality of checksums are computed based at least in part on the plurality of logical region access group descriptors in the first and second data outputs;

identifying, in response to an affirmative determination, at least one logical region access group of the plurality of logical region access groups corresponding to a checksum difference between computed checksums for the at least one logical region access group in the first and the second plurality of checksums; and identifying one or more storage devices of the at least one logical region access group corresponding to a state change;

wherein the control of delivery of the input-output operations from the host device to the storage system is based at least in part on the determination.

18. The method of claim 17 wherein the respective ones of the plurality of logical region access groups comprise respective ones of a plurality of asymmetric namespace access (ANA) groups.

19. The method of claim 18 wherein:
the plurality of logical region access group descriptors comprise a plurality of ANA group descriptors for the respective ones of the plurality of ANA groups; and
the first and the second plurality of checksums are computed for the plurality of ANA group descriptors in the first and second data outputs.

20. The method of claim 17 wherein the control of delivery of the input-output operations from the host device to the storage system is based at least in part on the state change of the one or more storage devices.

* * * * *